United States Patent [19]
Sayuda et al.

[11] Patent Number: 6,069,636
[45] Date of Patent: May 30, 2000

[54] EMBEDDING INFORMATION INTO IMAGES BY VARYING PIXEL PARAMETERS

[75] Inventors: Hiroyuki Sayuda; Masayuki Kurahashi, both of Nakai-machi, Japan

[73] Assignee: Fuji Xerox Co., Ltd., Tokyo, Japan

[21] Appl. No.: 08/730,757

[22] Filed: Oct. 15, 1996

[30] Foreign Application Priority Data

Dec. 20, 1995 [JP] Japan .................................. 7-349608

[51] Int. Cl.⁷ .................................................. G06T 11/00
[52] U.S. Cl. ........................ 345/433; 345/149; 345/152
[58] Field of Search ................................... 345/467, 433, 345/432, 147, 149, 152

[56] References Cited

U.S. PATENT DOCUMENTS

| | | | |
|---|---|---|---|
| 4,263,504 | 4/1981 | Thomas | 235/454 |
| 4,707,612 | 11/1987 | Martin | 250/568 |
| 4,794,239 | 12/1988 | Allais | 235/462 |
| 4,939,354 | 7/1990 | Priddy et al. | 235/456 |
| 4,949,381 | 8/1990 | Pastor | 380/51 |
| 5,337,362 | 8/1994 | Gormish et al. | 380/54 |
| 5,343,028 | 8/1994 | Figarella et al. | 235/462 |
| 5,355,448 | 10/1994 | Uchino | 345/467 |
| 5,396,584 | 3/1995 | Lee et al. | 345/432 |
| 5,513,563 | 5/1996 | Berson | 101/91 |
| 5,583,941 | 12/1996 | Yoshida et al. | 380/51 |
| 5,652,626 | 7/1997 | Kawakami et al. | 348/463 |
| 5,659,726 | 8/1997 | Sandford, II et al. | 707/101 |
| 5,689,587 | 11/1997 | Bender et al. | 382/232 |
| 5,946,414 | 8/1999 | Cass et al. | 382/183 |

*Primary Examiner*—Mark K. Zimmerman
*Assistant Examiner*—Albert K. Lee
*Attorney, Agent, or Firm*—Oliff & Berridge, PLC

[57] ABSTRACT

An image forming apparatus which comprises image inputter for inputting an image, information inputter for inputting information to be added to the image, image producer for producing an output pixel corresponding to the image inputted by the image inputter using a line screen whose line width is changed depending on desired density of the output pixel, position changer for changing a position of the output pixel to be produced in accordance with the information inputted by the information inputter in a line width direction of the line screen within the width of the screen in a process of producing the output pixel corresponding to the inputted image by the image producer, and controller for controlling the image producer to produce the output pixel in the position changed by the position changer using the line screen.

8 Claims, 18 Drawing Sheets

|  | | | | | PROHIBITION OF INFORMATION IMBEDDING (DENSITY NOT LESS THAN 240) | | | | | |
|---|---|---|---|---|---|---|---|---|---|---|
| INPUT IMAGE | 220 | 220 | 220 | 230 | 240 | 240 | 240 | 230 | 230 | 220 |
| EMBEDDED DATA | 0 | 1 | 0 | 1 | | | | 1 | 0 | 0 |
| TRIANGULAR PULSE WAVE SELECTION | 0 | 1 | 0 | 1 | 0 | 0 | 0 | 1 | 0 | 0 |

DATA EMBEDDED IN THE SECOND DOT LINE → 0 1 0 0 0 1 1 0 0 1

FIG. 13
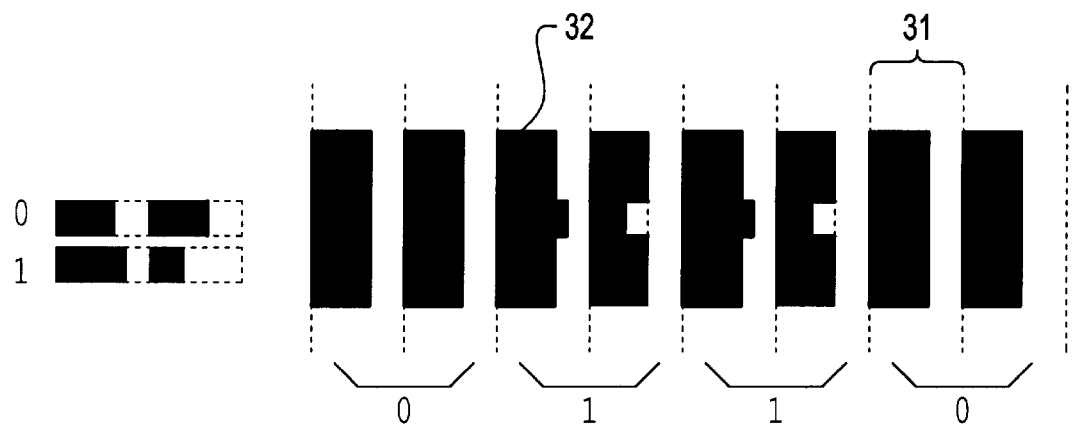
FIG. 14(A) FIG. 14(B) FIG. 14(a) FIG. 14(b)
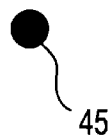
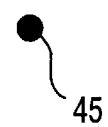
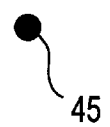
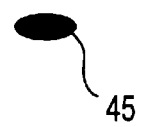

FIG. 17(A)  FIG. 17(B)  FIG. 17(a)  FIG. 17(b)
FIG. 18
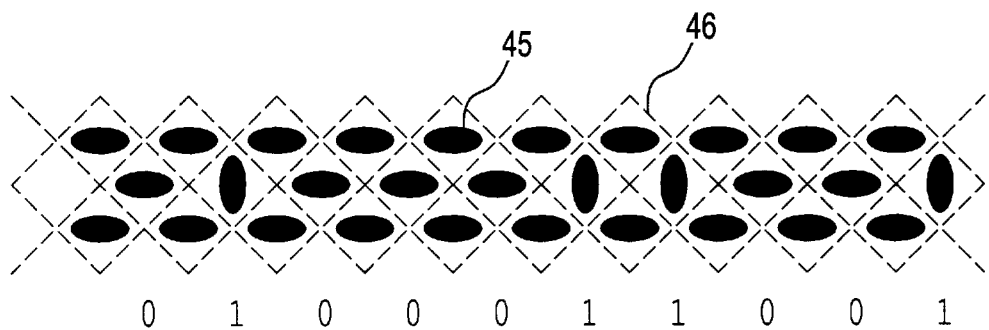
FIG. 19
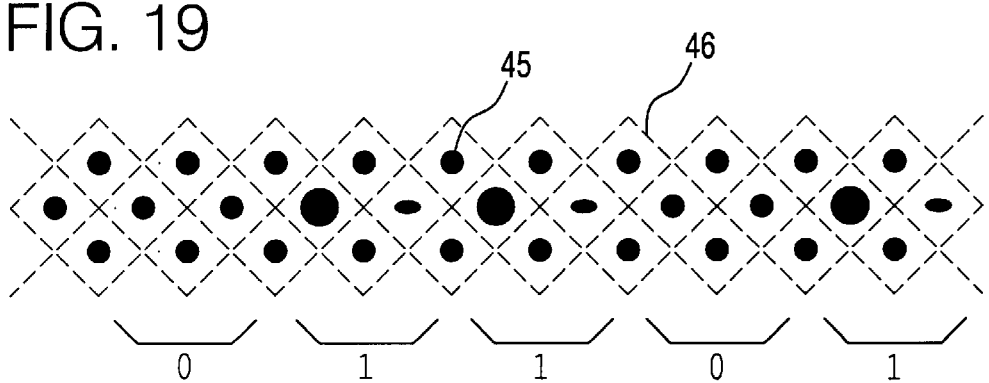

| | | | | | | | | | | |
|---|---|---|---|---|---|---|---|---|---|---|
| INPUT IMAGE | 0 | 0 | 0 | 0 | 220 | 220 | 220 | 0 | 0 | 0 |
| BACKGROUND IMAGE | 15 | 15 | 15 | 15 | 15 | 15 | 15 | 15 | 15 | 15 |
| SYNTHESIZED IMAGE | 15 | 15 | 15 | 15 | 220 | 220 | 220 | 15 | 15 | 15 |
| EMBEDDED INFORMATION | | 0 | 1 | 0 | 1 | | | | 1 | 0 | 1 |
| TRIANGULAR PULSE WAVE SELECTION | | 0 | 1 | 0 | 1 | 0 | 0 | 0 | 1 | 0 | 1 |

BACKGROUND PORTION     IMAGE PORTION     BACKGROUND PORTION

| INPUT IMAGE | 0 | 0 | 0 | 0 | 220 | 220 | 220 | 0 | 0 | 0 |
|---|---|---|---|---|---|---|---|---|---|---|
| BACKGROUND IMAGE | 30 | 0 | 30 | 0 | 30 | 0 | 30 | 0 | 30 | 0 |
| SYNTHESIZED IMAGE | 30 | 0 | 30 | 0 | 220 | 220 | 220 | 0 | 30 | 0 |
| EMBEDDED INFORMATION | 0 | 1 | 0 | 1 | | | | 1 | 0 | 1 |
| TRIANGULAR PULSE WAVE SELECTION | 0 | 1 | 0 | 1 | 0 | 0 | 0 | 1 | 0 | 1 |
| | | BACKGROUND PORTION | | | | IMAGE PORTION | | | BACKGROUND PORTION | |

EMBEDDING INFORMATION INTO IMAGES BY VARYING PIXEL PARAMETERS

BACKGROUND OF THE INVENTION

1. Field of the Invention

The present invention relates to an image forming apparatus which forms an image with pixels, such as a digital copying machine, a digital printer, an ink jet printer and a printing machine, and in particular relates to an image forming apparatus which embeds information, which is different from an image visually recognized and outputted as a visual image, in the image area or its background area so that the embedded information may not be recognized.

2. Discussion of the Related Art

In the field of image forming, addition of information to an image, which is different from the image such as a text or characters, has been conventionally conducted for increasing the information amount, keeping the information secret from a third party, and so forth.

For example, Japanese Patent Application Laid-Open No. Hei. 7-123244 (1995) discloses an invention providing an image processing apparatus which embeds information such as text information which is different from the color image to be formed in the process of forming a color image by means of changing the value of either color difference or chroma so that the total amount of three primary color components of the color image does not vary. That is, the invention embeds the different information in the color image so that the information may not be recognized utilizing the property of color difference and chroma that the variations in their high frequencies are hardly recognized by the user.

However, in this invention, the information can be embedded only in the position where the color image exists; therefore, the available areas for information embedding in the image are limited, and besides, change in the value of color difference or chroma should be considerably large so as to read the embedded information securely by a scanner or the like, and thereby the quality of the original color image is deteriorated.

Japanese Patent Application Laid-Open No. Hei 4-294682 (1992) discloses an image processing apparatus embedding the product number, the user identifier and so forth in the color image using yellow toner with a specific pattern which is difficult to be identified by user's observation. That is, this invention embeds the information different from a color image in the color image so that the information may not be recognized utilizing the user's observation characterized in that it is difficult to identify a specific pattern formed by the yellow toner. However, the invention has a default that the specific pattern is recognized in the portion of low density in the image, and thereby the quality of the color image is deteriorated.

Japanese Patent Application Laid-Open No. Hei. 5-301380 (1993) discloses an image processing method which examines the density of a color image, and according to the result, adds no specific pattern to the portion of low image density. This invention is able to overcome the above-described default, but there is another problem such that the area available for embedding the specific pattern is limited, and accordingly, the amount of information to be added is decreased.

Japanese Patent Application No. Hei. 4-334266 (1992) discloses methods and means for embedding machine readable digital data in halftone images utilizing digital data in the shapes of the marks called "glyphs". However, this invention has some problems such that the halftone image must be formed in the original image, and that the amount of the additional information is small because the marks constituting glyphs themselves are larger than pixels.

Japanese Patent Application Laid-Open No. Hei. 6-113111 (1994) discloses an image processing apparatus by which two states of color image data are formed. These two states of data have different amounts of K (black) by which a part of Y (yellow), M (magenta) and C (cyan) is replaced so that these two states of data may result in the same color image, and ID information is added to the image by assigning 0 or 1 to each of these states. However, the ID information cannot be added to a monochrome image, and besides, in some situations, two states cannot be formed for all of pixels in the image; therefore, there is a possibility of causing a case where it is impossible to add ID information.

Japanese Patent Application Laid-Open No. Sho. 63-214067 (1988) discloses a data embedding method for embedding information different from an image in the image by determining arrangement of elements in a dither matrix according to the information to be added in a process of representing the image by the dither method. Japanese Patent Application No. Hei. 2-266390 (1990) discloses an improvement of the above-described data embedding method which embeds information different from an image in the image by assigning 0 and 1 to the outputs of pairs of threshold value difference k (1, 0) and (0, 1) by application of the dither matrix.

However, these inventions using dither matrix have defaults such that the different information can be embedded only in a specific portion of the image, and that it can be applied only to the image forming apparatus employing the dither matrix as the representation of gradations. Furthermore, in the case where the information is embedded in an electronic image, it is easy to read the embedded information later because the position of the dither matrix can be specified, but in the case of the image outputted by the printer, it is almost impossible to specify the two dimensional position or pattern of the dither matrix in the image scanned by an image scanner.

As described above, various kinds of inventions for embedding and adding information different from an image to the image have been proposed, but there have been some problems such as the small amount of information which can be added, deterioration of image quality caused by addition of information, or difficulty in reading the embedded information from the image.

SUMMARY OF THE INVENTION

The present invention has been made in view of the above circumstances and has an object to provide an image forming apparatus which is able to embed a large amount of additional information in an image without making an eyesore and deteriorating the image quality.

Another object of the present invention is to provide an image forming apparatus which is able to embed the additional information in an area of a document containing no image without making an eyesore.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, an image forming apparatus of the present invention comprises image inputting means for inputting an image, information inputting means for inputting information to be added to the image, image producing means for producing an output pixel corresponding to the image inputted by the image inputting means using a line screen whose line width is changed depending on desired density of the output pixel, position changing means for changing a position of the output pixel to be produced in accordance with the information inputted by the information inputting means in a line width direction of the line screen within the width of the screen in a process of producing the output pixel corresponding to the inputted image by the image producing means, and controlling means for controlling the image producing means to produce the output pixel in the position changed by the position changing means using the line screen.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIG. 13 shows an example of pixel producing by the line screen of the fourth embodiment;

FIGS. 14(A), 14(B), 14(a) and 14(b) illustrates an example of the intensity modulation and the pulse width modulation in producing pixels constituting an image;

FIGS. 17(A), 17(B), 17(a) and 17(b) illustrates another example of the intensity modulation and pulse width modulation in producing pixels constituting an image;

FIG. 18 shows another example of pixel producing by the dot screen of the fifth embodiment;

FIG. 19 shows further example of pixel producing by the dot screen of the fifth embodiment;

DETAILED DESCRIPTION OF THE PREFERRED EMBODIMENT

Preferred embodiments of an image forming apparatus according to the present invention are now described in detail based on the drawings.

Figure 1:
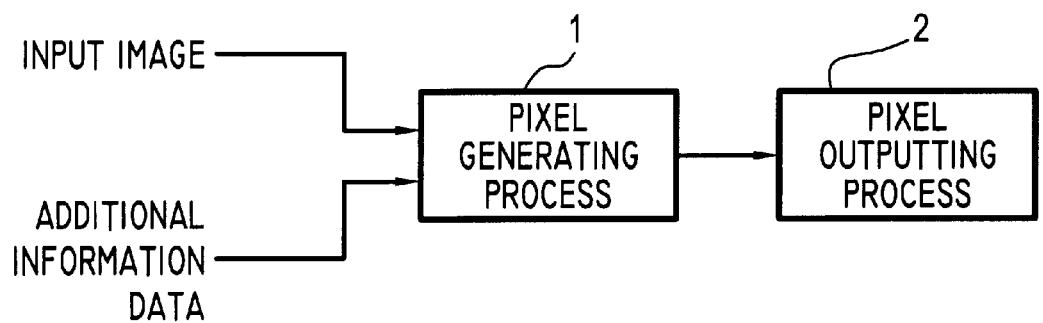
FIG. 1 schematically shows the construction of an image forming apparatus to which the present invention is applied.

FIG. 1 shows the schematic construction of an image forming process related to the present invention.

Broadly speaking, an image forming apparatus comprises a pixel generating step 1 and a pixel outputting step 2, and the present invention has characteristics in that, if an image which is visually recognized and additional information data which is different from the image are inputted, the pixel generating step 1 changes the positions, arrangements, geometrical features of pixels, or a pattern consisting of plural pixels in accordance with the additional information data, and generates the pixels corresponding to the inputted image.

The pixel outputting step 2 may be realized by means which is capable of outputting the pixels, such as an electrophotographic printer, an ink jet printer, and so forth.

First Embodiment

Figure 2:
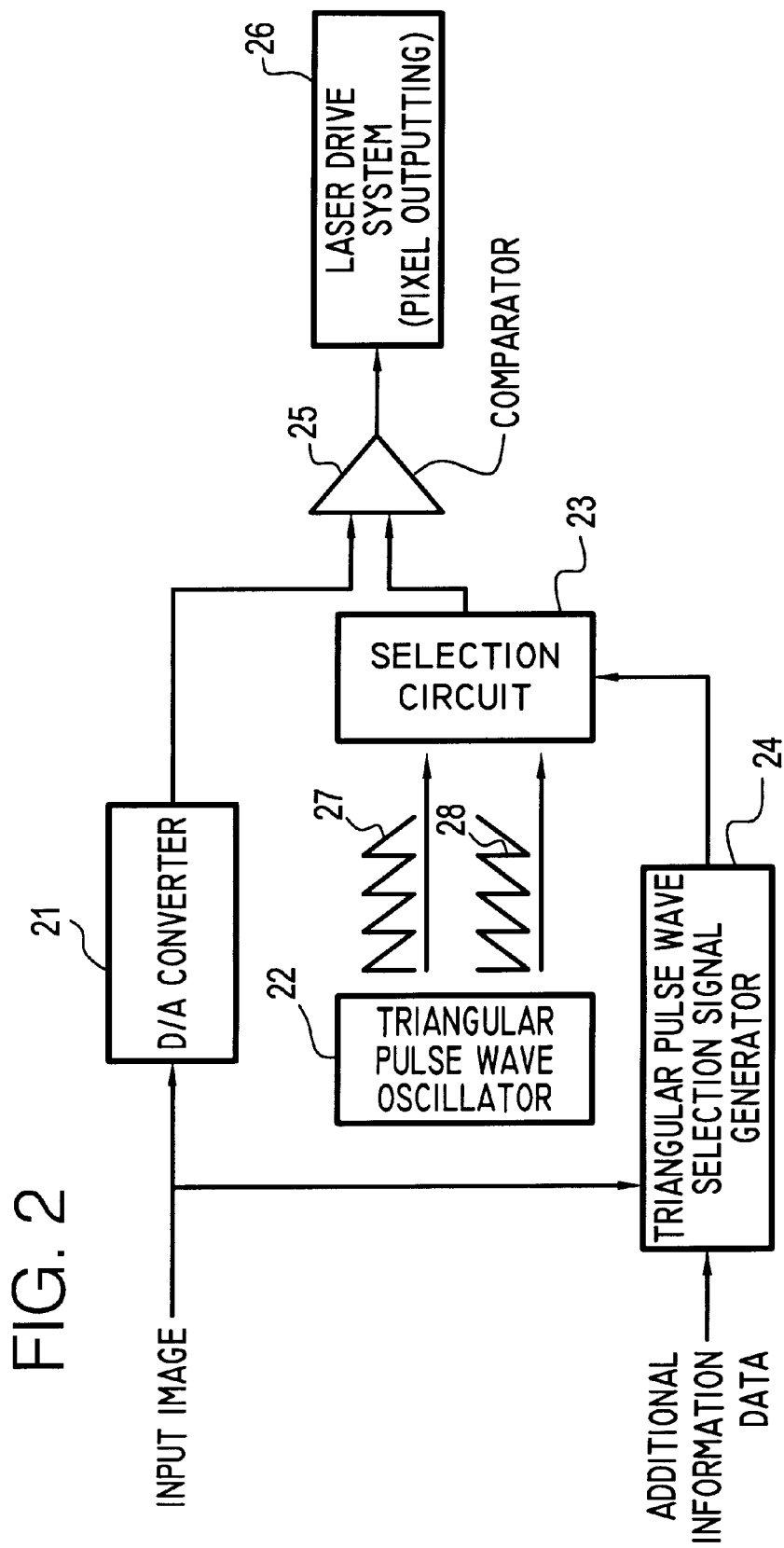
FIG. 2 shows the construction of an important part of an electrophotographic laser printer related to a first embodiment of an image forming apparatus according to the present invention.

FIG. 2 shows an important part of an electrophotographic laser printer which generates an image using the line screen as a first embodiment of the image forming apparatus according to the present invention. The laser printer has a D/A converter 21, a triangular pulse wave oscillator 22, a selection circuit 23, a triangular pulse wave selection signal generator 24, a comparator 25, and a laser drive system 26.

The D/A converter 21 converts an inputted image (digital density information) into analogue voltage information and outputs it to one of the input terminals of the comparator 25.

The triangular pulse wave oscillator 22 generates a triangular pulse wave for changing a position of the output pixel to be produced in the widthwise direction of the line screen. To be more concrete, the oscillator 22 generates 2 types of triangular pulse waves 27 and 28 having different peak positions as shown in the figure. The width of a single unit of the triangular pulse wave 27 or 28 corresponds to a single unit of the width of the line screen.

Here, the output pixel is a minimum unit which can be produced by an output device such as a printer, a copying machine, a facsimile apparatus and a printing plate manufacturing apparatus, and the size, shape and position are variable.

The width of the line screen means the maximum width of the output pixel. For example, in the case of the 200-line screen, the width is 0.127 mm.

The selection circuit 23 selects either generated triangular pulse wave 27 or 28, and outputs it to the other input terminal of the comparator 25.

The triangular pulse wave oscillator 24 transmits a selection signal based on the inputted image and additional information data, and thereby the selecting process by the selection circuit 23 is controlled in accordance with, for example, the additional information data 0 or 1.

The comparator 25 compares the analogue voltage of the inputted image with the level (analogue voltage) of the triangular pulse wave. If the level of the triangular pulse wave is larger than the analogue voltage of the inputted image, the comparator 25 outputs the level "H" (instruction to switch on the laser), and if the level of the triangular pulse wave is smaller than the analogue voltage, the comparator 25 outputs the level "L" (instruction to switch off the laser). Accordingly, when the triangular pulse wave 27 is selected, the level "H" is inputted to the laser drive system 26 at relatively late timing, and on the other hand, when the triangular pulse wave 28 is selected, the level "H" is inputted to the laser drive system 26 at relatively early timing.

The laser drive system 26 is the means for producing the output pixel utilizing the line screen, which produces the output pixel, while scanning it, on a recording medium in accordance with the instruction to switch on the laser. Therefore, if the triangular pulse wave 27 is selected, the output pixel is produced in a rearward part of the main scanning direction in the width of the line screen. If the triangular pulse wave 28 is selected, the output pixel is produced in a frontward part of the main scanning direction in the width of the line screen.

That is, according to the electrophotographic laser printer with the above-described construction, the inputted image is converted into the analogue voltage by the D/A converter 21 and inputted to the comparator 25. Either triangular pulse wave 27 or 28 generated by the triangular pulse wave oscillator 22 is selected by the selection circuit 23 corresponding to the additional information data and inputted to the comparator 25. The comparator 25 controls the laser drive system 26 at the timing based on the form of the triangular pulse wave according to the additional information data so that the output pixel is produced in the position which has been changed in the widthwise direction of the width of the line screen according to the additional information data.

Figure 3:
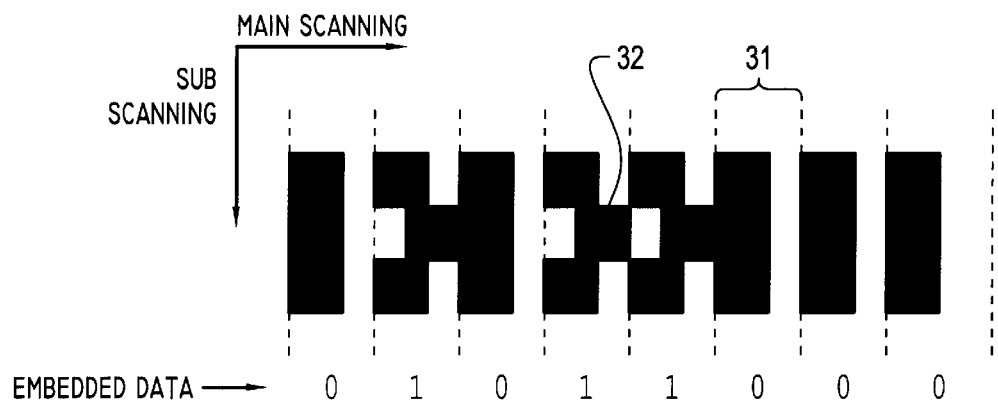
FIG. 3 shows an example of pixel producing by the line screen of the first embodiment.

FIG. 3 shows a state where the additional information data 0 and 1 are embedded in the line screen 31. If the embedded data is 0, the pixel 32 is produced in a leftmost position of the widthwise direction of the screen, and if 1 is embedded, the pixel 32 is produced in a rightmost position of the widthwise direction of the screen. That is, in the image constituted by the pixel 32, the additional information data 0 and 1 are embedded with distinction by the difference in positions of producing the pixel 32.

Figure 4:
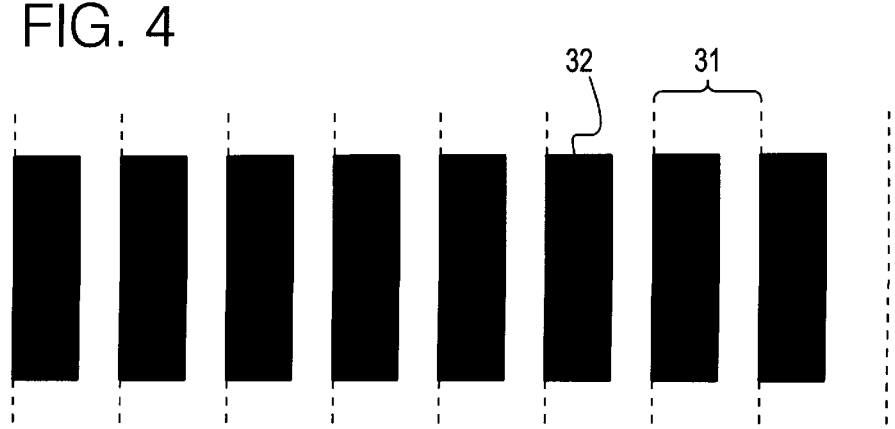
FIG. 4 shows a conventional example of pixel producing by the line screen.

In the conventional image forming, only one type of triangular pulse wave is generated; therefore, all of pixels 32 are produced in the leftmost positions of the line screen 31 as shown in FIG. 4. As it is understood by comparing FIG. 3 with FIG. 4, the ratio of the area occupied by the pixel 32 in the line screen 31 is the same in both cases, and accordingly, the additional information data can be embedded without changing the image density.

As the density of the inputted image is increased, the output pixel gains its width, and in the case of the highest density, the output pixel joins with an output pixel of an adjacent screen in some situations, whereby the information cannot be embedded (that is, it is impossible to change the position of the output pixel in the screen). A measure against this problem is as follows: the triangular pulse wave selection signal generator 24 observes the density of the inputted image, and makes the selection circuit 23 select fixed one of the triangular pulse waves (for example, 0) for the portion whose density is not less than a predetermined value (for example, not less than 240) as shown in FIG. 5 so that the additional information cannot be embedded.

Figures 5, 6:
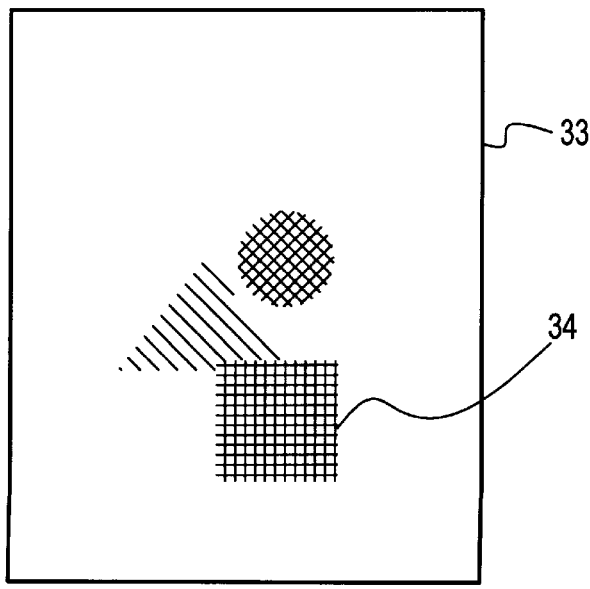
FIG. 5 illustrates selection of triangular pulse wave in accordance with the information in the first embodiment.
FIG. 6 shows an example of an outputted image in the first embodiment.

FIG. 6 shows an example of print output of the present embodiment. An image 34 is formed by the line screen in a document 33, in which information different from the image 34 visually recognized is embedded by differentiating positions of pixels constituting the image 34 so that the information may not be recognized.

Figure 7:
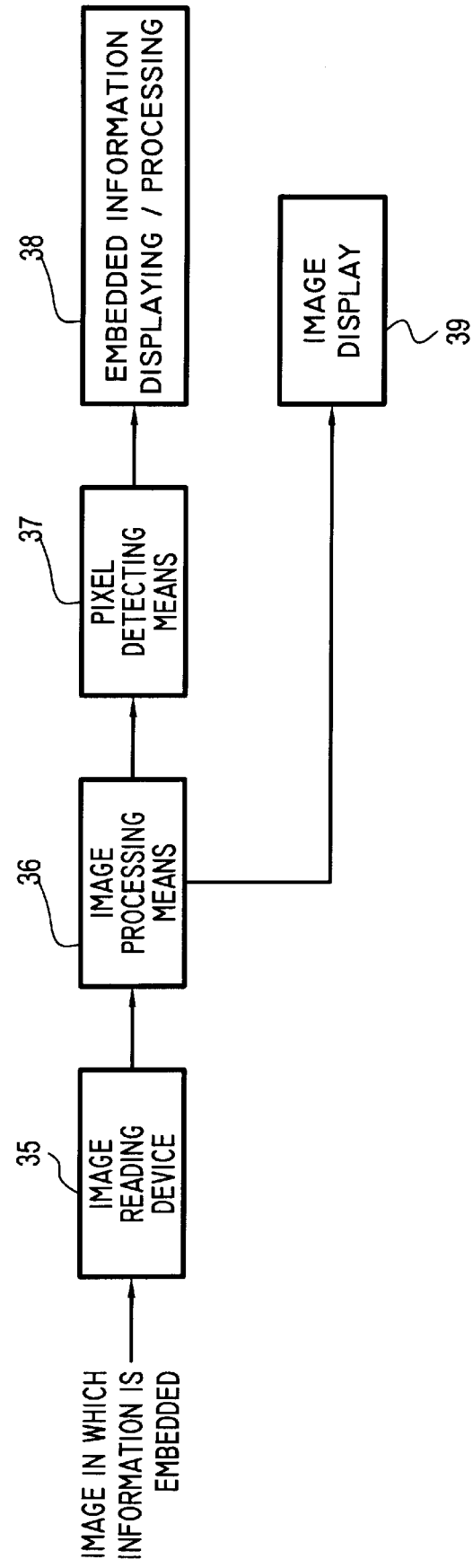
FIG. 7 schematically shows the construction of an example of a system extracting additional information embedded in the image.

A system such as shown in FIG. 7 is used for reading additional information embedded in an image as described above. In the case of the color image, for example, a color image reading device 35 reads an image from a document, an image processing means 36 providing an appropriate image processing such as shading modification on the image, and a pixel detecting means 37 detects the position of the pixel and reads the code 0 or 1, namely, the additional information embedded in the image. The additional information which has been read is displayed by processing means 38, or, a process predetermined in accordance with the additional information is conducted. The image gone through the image processing is displayed by the image display means 39.

Generally, in the case of forming an image of graphics or photographs, the line screen having 100 lines (100 lines / 25.4 mm) or the line screen having 200 lines (200 lines / 25.4 mm) is generally used; therefore, the image reading device having resolution of 400 dots / 25.4 mm or 600 dots / 25.4 mm can read the embedded additional information without encountering an obstacle.

In the present embodiment, the pixel 32 in FIG. 3 can be prolonged in the sub scanning direction by executing continuous change of pixel producing position over several lines in accordance with the additional information data. Consequently, embedded additional information can be extracted by a single scanning in the main scanning direction even though the image to be read by the image reading device 35 somewhat skews, and the additional information can be extracted at extreme high speed because processing of two dimensional image is unnecessary.

Second Embodiment

Figure 8:
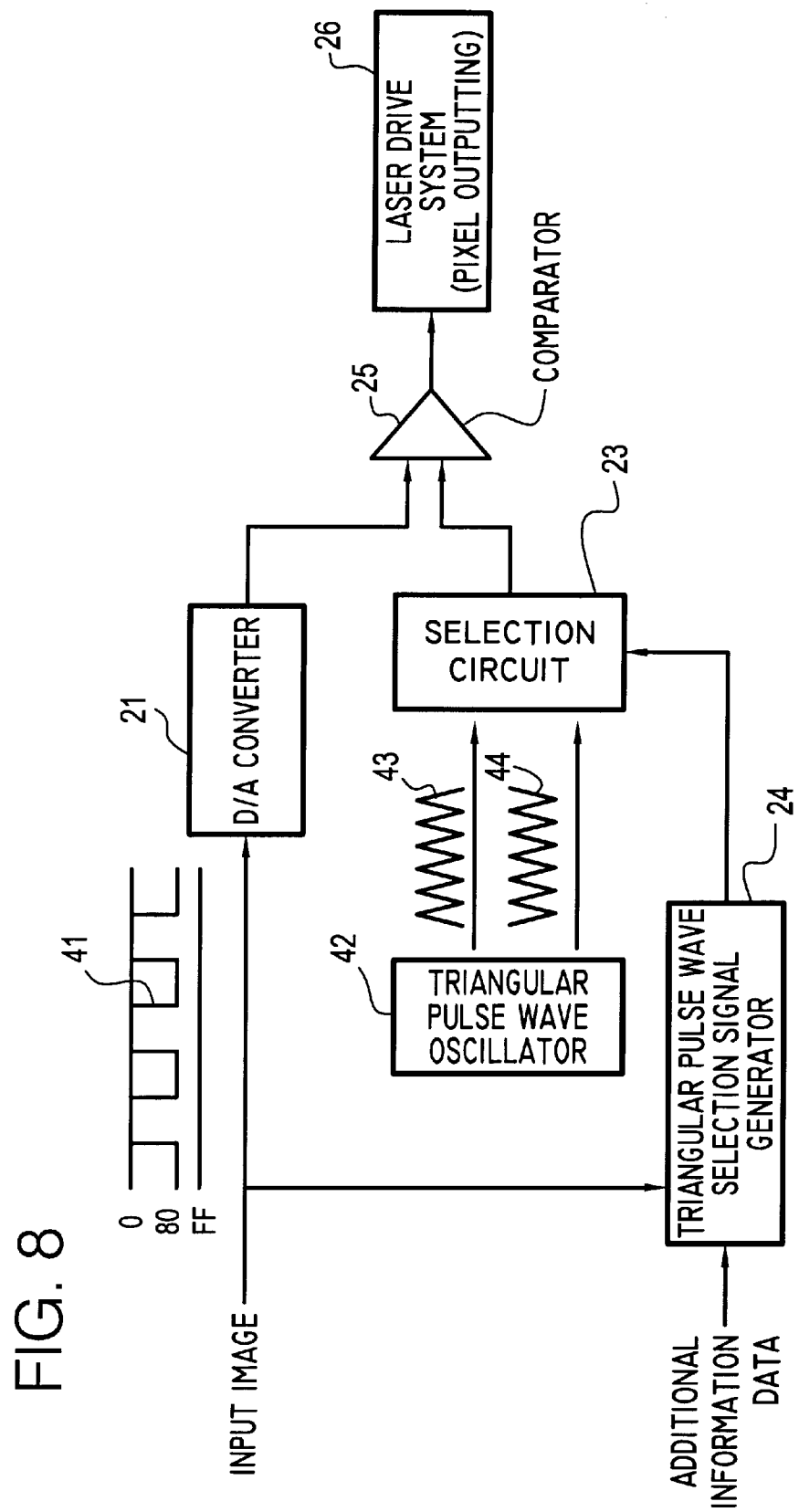
FIG. 8 shows the construction of an important part of an electrophotographic laser printer related to a second embodiment.

FIG. 8 shows an important part of an electrophotographic laser printer which forms an image using the dot screen as a second embodiment of the image forming apparatus according to the present invention. Constituents corresponding to constituents of the above-described first embodiment have the same reference numbers as those of the first embodiment and redundant explanations are omitted.

In this embodiment, the inputted image is supposed to be a waveform 41 switching between 0 and a predetermined value as shown in FIG. 8. For example, if the density of the image is 40, the waveform 41 switches between 0 and 80 so that the average density may be 40.

A triangular pulse wave oscillator 42 of this embodiment generates 2 types of triangular pulse waves 43 and 44 having phases different from each other by a half period, which are inputted to the selection circuit 23 and selected in accordance with the additional information.

The comparator 25 outputs the inputted image at the timing of either triangular pulse wave 43 or 44. To be more concrete, when the triangular pulse wave 44 is selected, a laser emission instruction "H" is inputted to the laser drive system 26 at relatively late timing, and on the other hand, when the triangular pulse wave 43 is selected, the laser emission instruction "H" is inputted to the laser drive system 26 at relatively early timing. Thereby, as shown in FIG. 9, the laser drive system 26 produces the output pixel 45 in accordance with the additional information while scanning it on a recording medium utilizing a dot screen.

Figure 9:
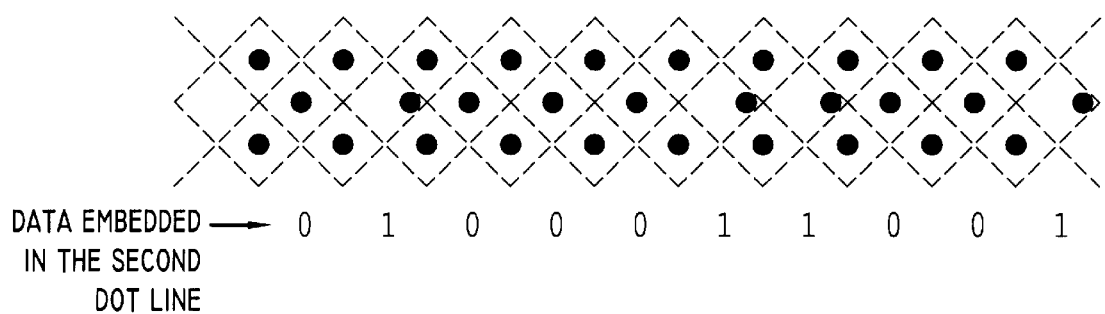
FIG. 9 shows an example of pixel producing by the dot screen of the first embodiment.

In other words, in the example of producing the pixel 45 shown in FIG. 9, the pixel 45 is produced in a rightmost position in a cell 46 of the dot screen when the additional information data is 1, and the pixel 45 is produced at the center of the cell 46 when the additional information data is 0. Thus the additional information can be added in the image by changing the position of the pixel 45 in the cell 46 by the additional information data without changing the density of the image and without being recognized.

Here, the cell is one of the unit areas constituting a dot screen, which is, for example, the minimum square area represented by dotted lines in FIG. 9.

The additional information embedded in the image by the current embodiment can also be read by the system shown in FIG. 7.

Third Embodiment

In this embodiment, the additional information can be assigned to two or more types of patterns consisting of plural pixels, and embedded in the image.

Figure 10:
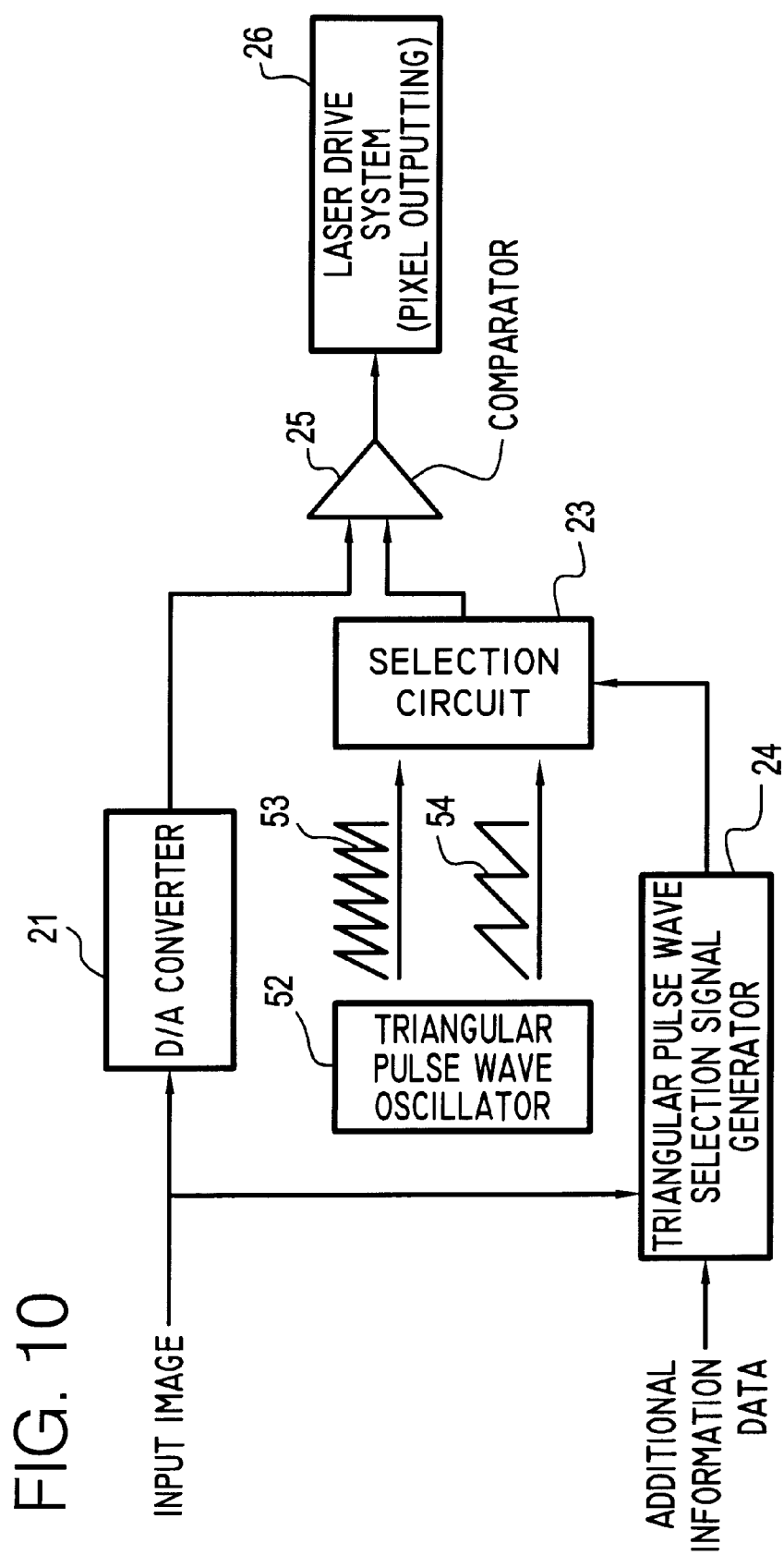
FIG. 10 shows the construction of an important part of an electrophotographic laser printer related to a third embodiment.

FIG. 10 shows an important part of an electrophotographic laser printer which assigns additional information to a pattern consisting of plural pixels and embeds it in an image when the image is formed utilizing the line screen as a third embodiment of the image forming apparatus according to the present invention. Constituents corresponding to constituents of the first embodiment have the same reference numbers as those of the first embodiment and redundant explanations are omitted.

As shown in FIG. 10, a triangular pulse wave oscillator 52 of this embodiment generates two types of triangular pulse waves: a triangular pulse wave 53 having a predetermined period and a triangular pulse wave 54 having a period twice as long as that of the triangular pulse wave 53. These triangular pulse waves 53 and 54 are inputted to the selection circuit 23 and are selected in accordance with the additional information data.

The comparator 25 outputs the inputted image at the timing of either triangular pulse wave 53 or 54. To be more concrete, when the triangular pulse wave 53 is selected, the inputted image information is inputted to the laser drive system 26 at the timing corresponding to the period of the triangular pulse wave 53, and on the other hand, when the triangular pulse wave 54 is selected, the inputted image information is inputted to the laser drive system 26 at the timing of period twice as long as that of the case where the triangular pulse wave 53 is selected. Moreover, when the triangular pulse wave 54 is selected, the operation time of the laser drive system 26 becomes longer than that in the case where the triangular pulse wave 53 is selected at the rate of the wider waveform width.

Figure 11:
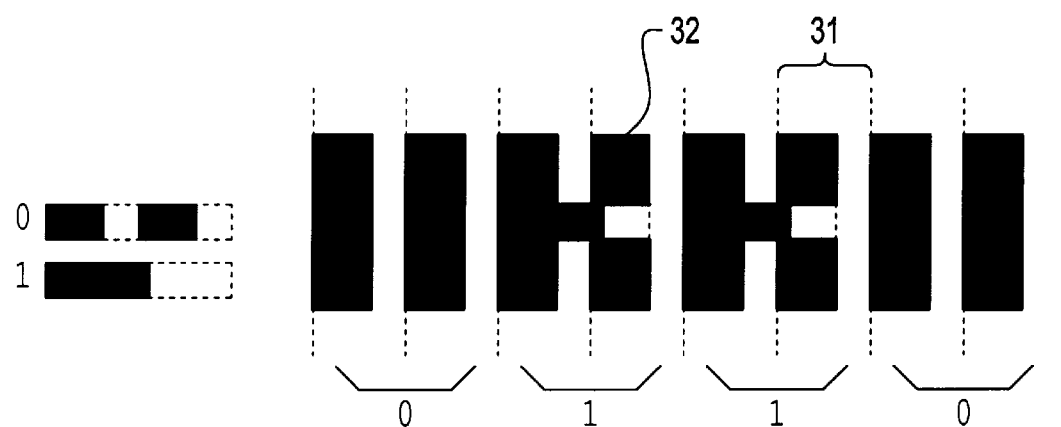
FIG. 11 shows an example of pixel producing by the line screen of the third embodiment.

Thus, as shown in FIG. 11, the laser drive system 26 produces the output pixel 32 corresponding to the inputted image while scanning it on a recording medium utilizing the line screen 31.

That is, in the example of producing of the pixel 32 shown in FIG. 11, when the additional information data is 0 and the triangular pulse wave 53 is selected, the pixel 32 is produced with a predetermined width in the main scanning direction on every screen 31, and when the additional information data is 1 and the triangular pulse wave 54 is selected, the pixel 32 is produced with the width larger than the above described in the main scanning direction on every second screen 31.

In this way, the additional information is embedded without changing the density of the image and without being recognized by representing the additional information by a pixel producing pattern related to a pair of screens 31.

Fourth Embodiment

Figure 12:
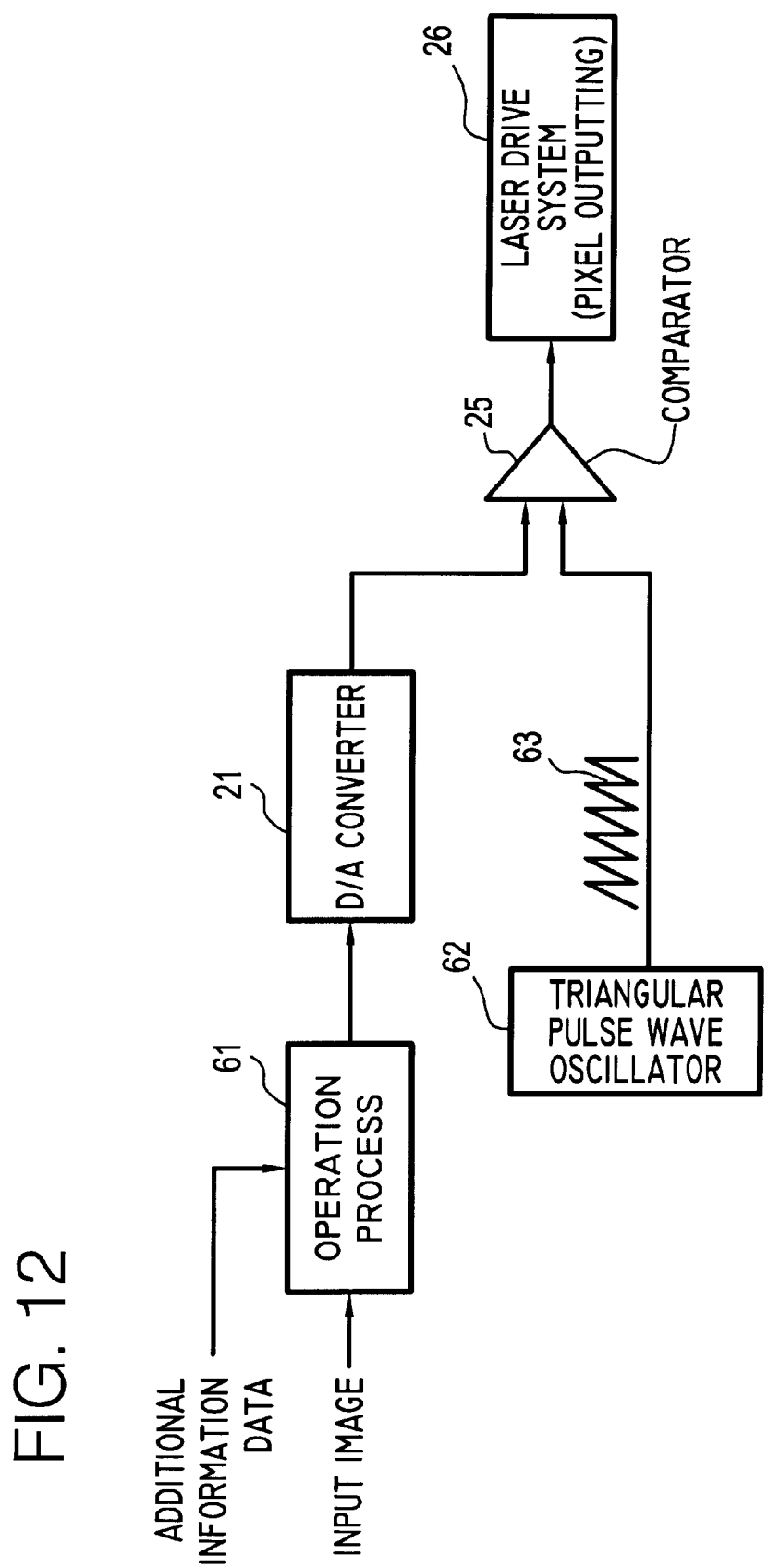
FIG. 12 shows a construction of an important part of an electrophotographic laser printer related to a fourth embodiment.

FIG. 12 shows an important part of an electrophotographic laser printer which assigns additional information to a pattern consisting of plural pixels and embeds it in an image when the image is formed utilizing the line screen as a fourth embodiment of the image forming apparatus according to the present invention. Constituents corresponding to constituents of the first embodiment have the same reference numbers as those of the first embodiment and redundant explanations are omitted.

This embodiment is equipped with operation means 61 for conducting a density controlling process on the inputted image based on the additional information data. For example, if the additional information data is 1, the density of one of two pixels in a series in the main scanning direction is increased by a predetermined value, and the density of the other pixel is decreased by the same predetermined value. If the additional information data is 0, the operation process is not conducted and the density of the pixels is left as it is.

A specific pixel producing control based on the triangular pulse wave is not carried out in this embodiment; therefore, the triangular pulse wave oscillator 62 generates only one type of the triangular pulse wave 63 having a predetermined period, and the circuit for selecting the triangular pulse wave is omitted. Consequently, the comparator 25 outputs the inputted image to the laser drive system 26 at the timing corresponding to the period of the triangular pulse wave 63, and as shown in FIG. 13, the pixel 32 is produced corresponding to the inputted image utilizing the line screen 31. The pixel 32 whose density is increased by the operation means 61 is produced widely in the main scanning direction, and the pixel 32 whose density is decreased is produced narrowly in the main scanning direction.

That is, in the example of producing the pixel 32 shown in FIG. 13, if the additional information data is 0, a pair of pixels 32 which are successive in the main scanning direction is produced with a predetermined width in the main scanning direction on every screen 31, whereby the additional information data 0 is represented by the pair of pixels 32. If the additional information data is 1, one of the pair of pixels 32 which are successive in the main scanning direction is widely produced and the other is narrowly produced, whereby the additional information data 1 is represented by the pair of pixels 32. In this embodiment, the additional information data is also embedded without changing the image density and without being recognized by representing the additional information data by the pixel producing pattern for a pair of screens 31.

In the third and fourth embodiments described above, the pattern is generated based on the line screen, but any kind of screen can be used in the present invention and any pattern can be used as long as it is composed of two or more types of patterns each consisting of plural pixels.

Fifth Embodiment

In the present invention, it is possible to assign a code of the additional information to each pixel and embed it in the image utilizing two or more types of pixels having different geometric features which are elements characterizing the output pixel. To produce such two or more types of pixels, the intensity modulation and the pulse width modulation are mainly used in the laser modulation technique in the field of the electrophotography or the like: the intensity modulation changes the size of the pixel 45 as shown in FIGS. 14(A) and 14(B), and the pulse width modulation changes the length of the pixel 45 in the main scanning direction as shown in FIGS. 14(*a*) and 14(*b*).

Figure 15:
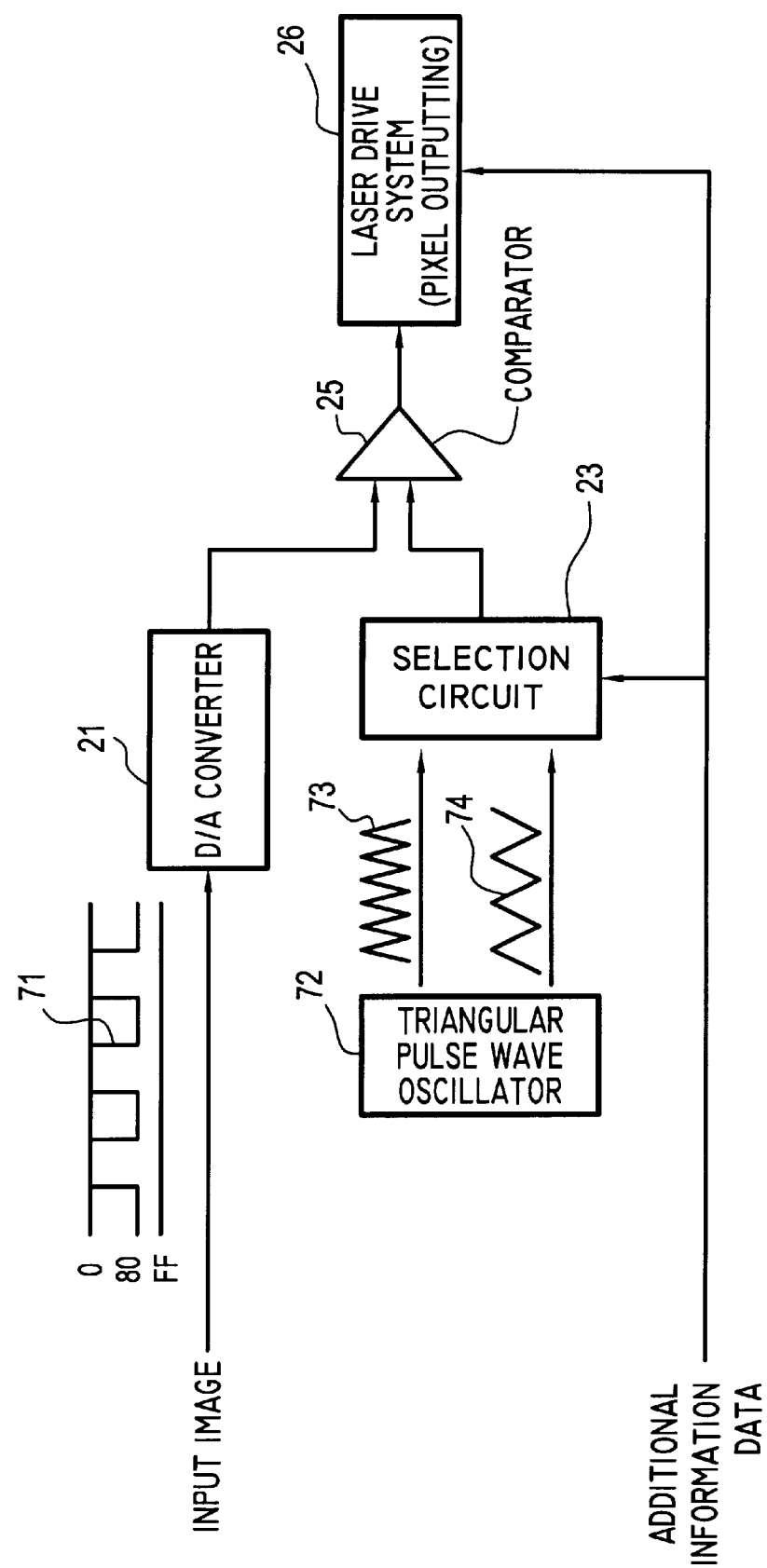
FIG. 15 shows the construction of an important part of an electrophotographic laser printer related to a fifth embodiment.

FIG. 15 shows an important part of an electrophotographic laser printer which produces pixels having different geometric features such as the size, length, direction or the like by carrying out both of intensity modulation and pulse width modulation, and forms an image utilizing the dot screen as a fifth embodiment of the image forming apparatus according to the present invention. Constituents corresponding to constituents of the first embodiment have the same reference numbers as those of the first embodiment and redundant explanations are omitted.

In this embodiment, as same as the second embodiment described above, the inputted image is supposed to be a waveform 71 switching between 0 and a predetermined value as shown in FIG. 15.

A triangular pulse wave oscillator 72 of this embodiment, as shown in FIG. 15, generates two types of triangular pulse waves: a triangular pulse wave 73 having a predetermined period and a triangular pulse wave 74 having a period twice as long as that of the triangular pulse wave 73. These triangular pulse waves 73 and 74 are inputted to the selection circuit 23, and one of them is selected in accordance with the additional information data. In this way, the pulse width is modulated by changing the periods of the triangular pulse waves.

The additional information data is also inputted to the laser drive system 26, and the laser intensity to be outputted in accordance with the additional information data is modulated by controlling the current.

Consequently, the comparator 25 outputs the inputted image at the timing either triangular pulse wave 73 or 74, and the laser drive system 26 produces the pixel 45 in accordance with the timing and the additional information data. To be more concrete, if the additional information data is 0 and the triangular pulse wave 73 is selected, the laser drive system 26 produces a round pixel 45 as shown in FIG. 14(A) by reducing the pulse width and increasing the laser intensity. If the additional information data is 1 and the triangular pulse wave 74 is selected, the laser drive system 26 produces the elliptic pixel 45 prolonged in the main scanning direction as shown in FIG. 14(*b*) by increasing the pulse width and reducing the laser intensity.

Figure 16:
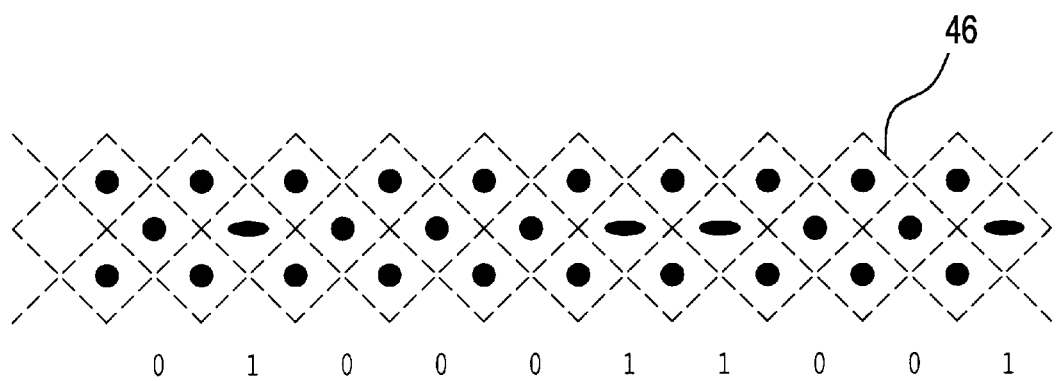
FIG. 16 shows an example of pixel producing by the dot screen of the fifth embodiment.

That is, in the example of producing the pixel 45 shown in FIG. 16, if the additional information data is 0, the pixel 45 is produced roundly in the cell 46 of the dot screen, and if the additional information data is 1, the pixel 45 is produced elliptically in the cell 46. Thus, the additional information is embedded in the image without changing the image density and without being recognized by changing the feature of the pixel 45 in the cell 46 in accordance with the additional information data.

The feature of the pixel 45 to be produced can be variously changed depending on the kinds of the modulation method. For example, when the shape of the laser beam spot is elliptic, the size of the pixel 45 can be changed as shown in FIGS. 17(A) and 17(B) by conducting the intensity modulation, and it can be changed as shown in FIGS. 17(*a*) and 17(*b*) by conducting the pulse width modulation. Accordingly, the additional information data 0 and 1 can be represented by directions of the pixel 45 and embedded in the image as shown in FIG. 18 by using two types of pixels 45 having different directions as shown in FIGS. 17(A) and 17(*b*).

As shown in FIGS. 14(A) and 14(B), the additional information can be represented by the round pixels 45 produced only with the intensity modulation. However, in this case, if the additional information data 0 and 1 are simply assigned to large and small pixels 45, the image density is unnecessarily changed by the additional information data. Therefore, as shown in FIG. 19, it is desirable to assign the additional information data 0 and 1 so that the average value of the density may not be changed by making a pair of two pixels 45 consecutive in the main scanning direction, such that 0 is assigned to the pair of pixels 45 of the same middle size, and 1 is assigned to the pair of large and small pixels 45.

Sixth Embodiment

In the present invention, it is possible to produce a background in the area other than the image portion in the inputted image, and assign the code of the additional information to the pixel in the background portion for embedding.

Figure 20:
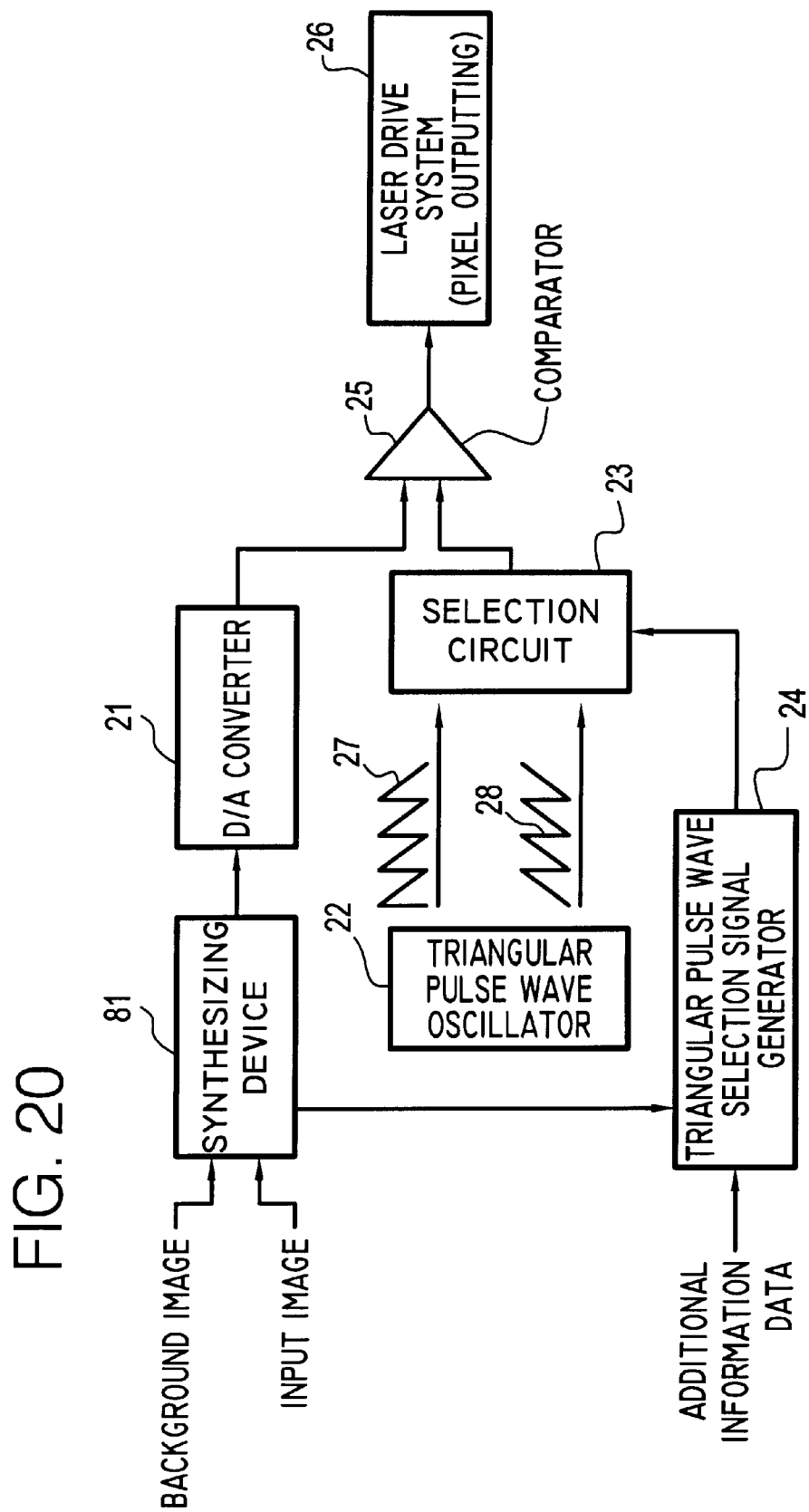
FIG. 20 shows the construction of an important part of an electrophotographic laser printer related to a sixth embodiment.

FIG. 20 shows an important part of an electrophotographic laser printer which embeds additional information in the background of the image as a sixth embodiment of the image forming apparatus according to the present invention. Constituents corresponding to constituents of the first embodiment have the same reference numbers as those of the first embodiment and redundant explanations are omitted.

This embodiment is equipped with a synthesizing device 81 for synthesizing the inputted image and a background image (for example, a pale uniform color image). The synthesizing device 81 regards the portion whose density is not more than a predetermined value (for example, the density 0) in the inputted image 11 as having no image, and synthesizes a background image therein.

The synthesizing device 81 transmits an identification signal for identifying the background portion or the image portion to the triangular pulse wave selection signal generator 24, and the triangular pulse wave selection signal generator 24 outputs the triangular pulse wave selection signal to the selection circuit 23 so that the additional information may be embedded only in the background portion. For example, the triangular pulse wave 27 is selected for the image portion and the background portion corresponding to the additional information data 0 and inputted to the comparator 25, and the triangular pulse wave 28 is selected for the background portion corresponding to the additional information data 1 and inputted to the comparator 25.

Figures 21, 22:
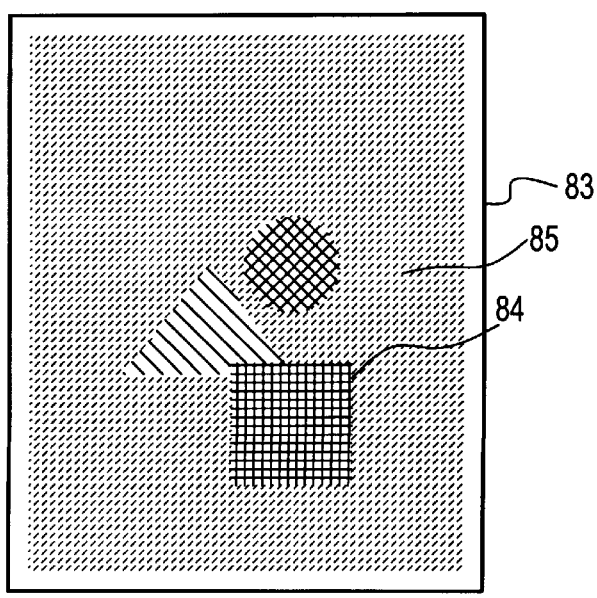
FIG. 21 illustrates selection of a triangular pulse wave in accordance with the information in the sixth embodiment.
FIG. 22 shows an example of an outputted image in the sixth embodiment.

FIG. 21 represents the image density by the numeric values (decimal numerals). In the figure, if the synthesizing device 81 synthesizes the background image of the constant density 15 to the inputted image, the density of the synthesized image is as shown in the figure. In this example, the density of the image portion of the inputted image is 220 and there is no image in the portion of the density 0; therefore, no image portion is replaced by the background image of the density 15, thereby the inputted image and the background image are synthesized.

Since the triangular pulse wave selection signal is generated so as to embed the additional information only in the background portion, the position of the pixel 32 to be produced in the line screen 31 is changed only in the background portion in accordance with the additional information data, and consequently the additional information can be embedded in the background portion without changing the density of the image portion and without being recognized. In the case of the color image, the background image can be synthesized to the portion having a certain density (for example, density 0) in all of the inputted images of Y (yellow), M (magenta), C (cyan) and K (black).

FIG. 22 shows an example of print output of this embodiment. An image portion 84 and a background portion 85 are formed in a document 83 by the line screen, wherein information different from the visually recognized images 84 and 85 can be embedded therein without being recognized owing to the difference of producing positions of pixels constituting the background portion 85. Being compared with the image portion, the background portion can be formed with a pale, uniform color; therefore the information can be embedded without being recognized more effectively in the current embodiment.

In the sixth embodiment, the position of the output pixel in the line screen is changed as same as the first embodiment, but the additional information can be embedded in the background image using the methods described in the embodiments from the second to the fifth.

Seventh Embodiment

Figure 23:
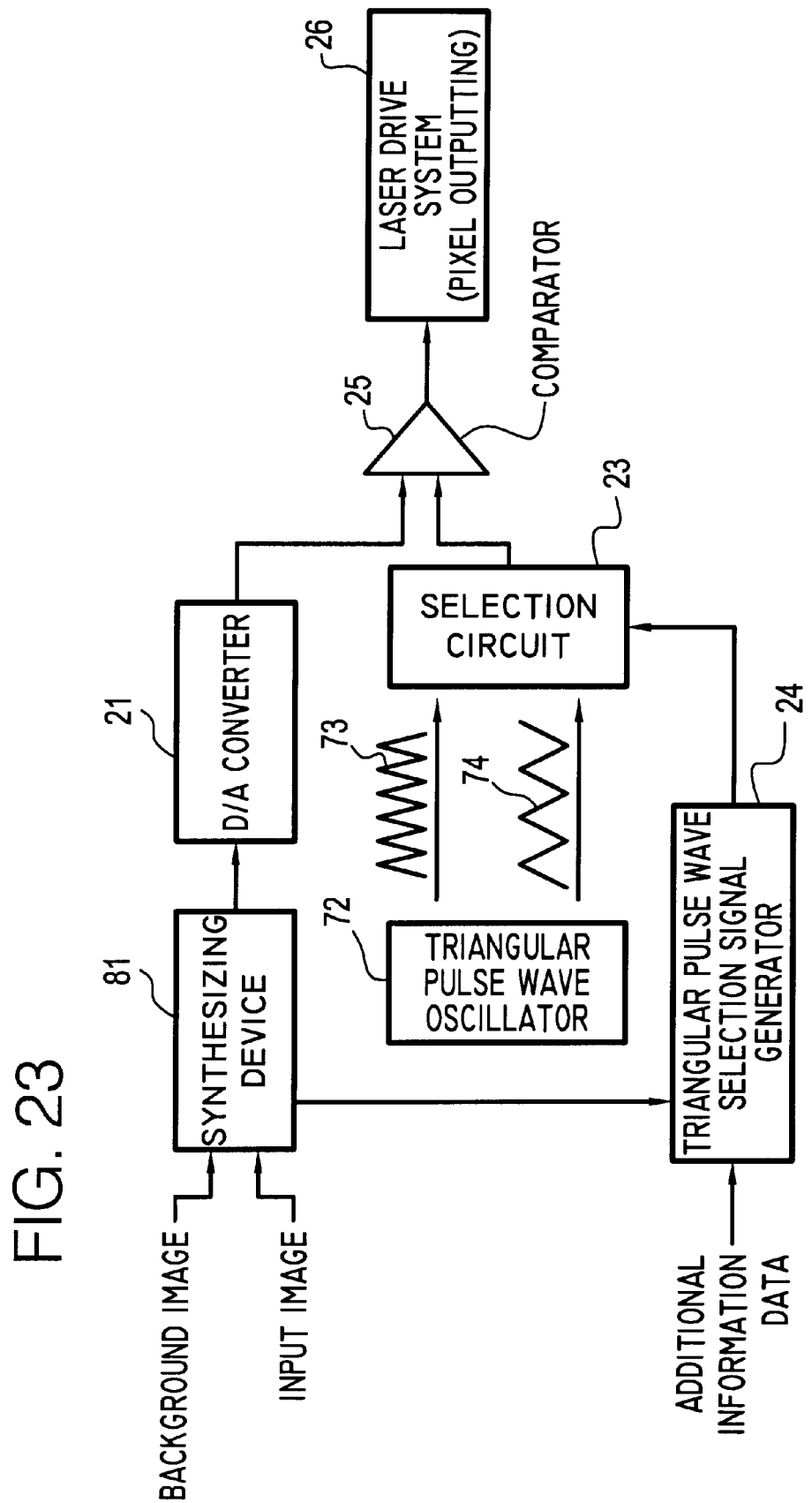
FIG. 23 shows the construction of an important part of an electrophotographic laser printer related to a seventh embodiment.

FIG. 23 shows an important part of an electrophotographic laser printer which embeds additional information in the background as a seventh embodiment of the image forming apparatus according to the present invention. Constituents corresponding to constituents of the fifth and sixth embodiments have the same reference numbers as those of the fifth and sixth embodiments and redundant explanations are omitted.

This embodiment has the construction which is the same as that of the sixth embodiment (shown in FIG. 20) except for the triangular pulse wave oscillator. As the triangular pulse wave oscillator, that of the fifth embodiment (the triangular pulse wave oscillator 72, see FIG. 15) is employed, and therefore pixel producing by the dot screen as shown in FIG. 16 is carried out based on the triangular pulse waves 73 and 74 generated by the triangular pulse wave oscillator 72.

In this embodiment, the portion of the density not more than a predetermined value (for example, 0) in the inputted image is regarded as having no image, and the background image is synthesized thereto. The synthesizing device 81 transmits the identification signal for identifying the background portion or the image portion to the triangular pulse wave selection signal generator 24, and the triangular pulse wave selection signal generator 24 outputs the triangular pulse wave selection signal to the selection circuit 23 so as to embed the additional information only in the background portion. For example, the triangular pulse wave 73 is selected and inputted to the comparator 25 for the image portion and the background portion corresponding to the additional information data 0, and the triangular pulse wave 74 is selected and inputted to the comparator 25 for the background portion corresponding to the additional information data 1.

Figures 24, 25:
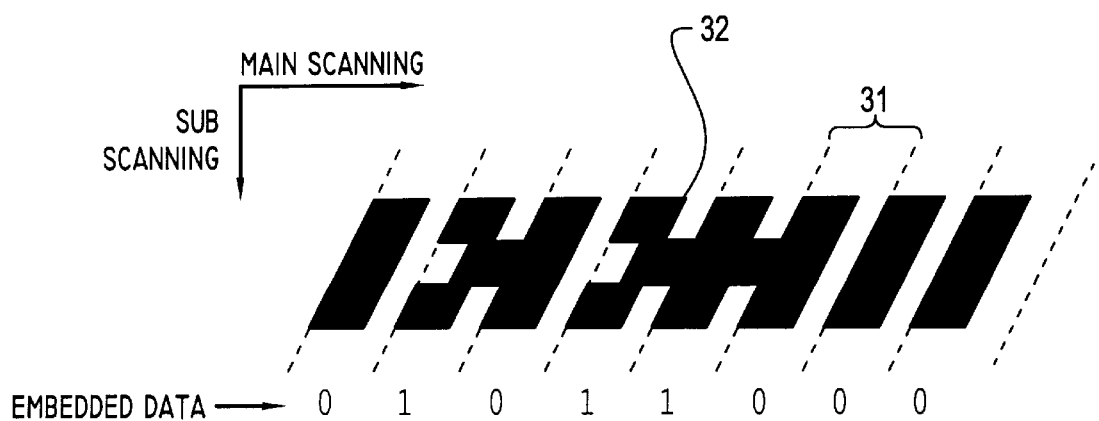
FIG. 24 illustrates selection of a triangular pulse wave in accordance with the information in the seventh embodiment.
FIG. 25 shows the other mode of the line screen.

For example, FIG. 24 represents the image density by the numeric values (decimal numerals). In the figure, if the synthesizing device 81 synthesizes the background image of the density 30 or 0 (average value is 15) to the inputted image, the density of the synthesized image is as shown in the figure. In this example, the density of the inputted image is 220 and there is no image in the portion of the density 0; therefore, no image portion is replaced by the background image of the density 30 or 0, thereby the inputted image and the background image are synthesized.

In the above-described embodiments using the line screen, as shown in FIG. 3, the line screen 31 is supposed to be set perpendicular to the main scanning direction, but the present invention can also use the line screen 31 set oblique to the main scanning direction as shown in FIG. 25. In this case, the position of the output pixel 32 to be produced practically exists in the widthwise direction of the line screens 31 (providing that the direction having an angle in accordance with the angle of the screen 31), whereby the additional information is represented.

Moreover, in the above-described embodiments, the example of producing pixels while scanning them is illustrated. However, the present invention may be applied to an apparatus which forms an image by pixels without scanning, such as a manufacturing machine of the printing plate. In other words, the present invention can be applied to any type of image forming apparatus which forms an image by pixels such as a digital copying machine, digital printer, ink jet printer, and a printing machine.

Furthermore, according to the present invention, the additional information may be embedded not only in the image portion or the background portion, but also in the whole synthesized image containing thereof, and consequently, the amount of the additional information can be further increased.

The foregoing description of preferred embodiments of this invention has been presented for purposes of illustration and description. It is not intended to be exhaustive or to limit the invention to the precise form disclosed, and modifications and variations are possible in light of the above teachings or may be acquired from practice of the invention. The embodiment were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus comprising:

image inputting means for inputting an image having an image density;

information inputting means for inputting information to be added to said image to create a modified image;

image producing means for producing an output image that is represented by a plurality of output pixels corresponding to said modified image using a line screen whose line width is changed without changing the image density;

position changing means for changing a position of at least one of said output pixels to be produced in accordance with said information inputted by said information inputting means, the position of said at least one output pixel being changed in a line width direction of said line screen within the width of said screen in a process of producing said output image by said image producing means, the information to be added to said image being represented by the change in the position of said at least one output pixel; and controlling means for controlling said image producing means to produce said at least one output pixel in said position changed by said position changing means using said line screen.

2. An image forming apparatus comprising:

image inputting means for inputting an image having an image density;

background image inputting means for inputting a background image of said image;

information inputting means for inputting information to be added to said background image to create a modified image;

image producing means for producing an output image that is represented by a plurality of output pixels corresponding to said modified image using a line screen whose line width is changed without changing the image density;

position changing means for changing a position of at least one of said output pixels to be produced according to said information inputted by said information inputting means, the position of said at least one output pixel being changed in a line width direction of said line screen within the width of said screen in a process of producing said output image, the information to be added to said background image being represented by the change in the position of said at least one output pixel;

synthesizing means for synthesizing said image inputted by said image inputting means and said at least one output pixel whose position is changed by said position changing means; and controlling means for controlling said image producing means to produce the output image corresponding to an image synthesized by said synthesizing means.

3. An image forming apparatus comprising:

image inputting means for inputting an image having an image density;

information inputting means for inputting information to be added to said image to create a modified image;

image producing means for producing an output image that is represented by a plurality of output pixels corresponding to said modified image using a dot screen which changes the size of at least one of said output pixels without changing the image density;

position changing means for changing a position of said at least one output pixel to be produced according to said information inputted by said information inputting means in a cell of said dot screen in a process of producing said output image by said image producing means, the information to be added to said image being represented by the change in the position of said output pixel; and controlling means for controlling said image producing means to produce said at least one output pixel in said position changed by said position changing means using said dot screen.

4. An image forming apparatus comprising:

image inputting means for inputting an image having an image density;

background image inputting means for inputting a background image of said image;

information inputting means for inputting information to be added to said background image to create a modified image;

image producing means for producing an output image that is represented by a plurality of output pixels corresponding to said modified image using a dot screen which changes the size of at least one of said output pixels without changing the image density;

position changing means for changing a position of said at least one output pixel to be produced according to said information inputted by said information inputting means in a cell of said dot screen in a process of producing said output image, the information to be added to said background image being represented by the change in the position of said at least one output pixel;

synthesizing means for synthesizing said image inputted by said image inputting means and said at least one output pixel whose position is changed by said position changing means; and controlling means for controlling said image producing means to produce the output image corresponding to an image synthesized by said synthesizing means.

5. An image forming apparatus comprising:

image inputting means for inputting an image having an image density;

information inputting means for inputting information to be added to said image;

first image producing means for producing an output image that includes a first pixel having a first geometric feature value on every scanning line using a dot screen which changes the size of an output pixel depending on desired density of said output pixel;

second image producing means for producing an output image that includes a second pixel having a second geometric feature value different from said first geometric feature value of said first pixel produced by said first image producing means on every scanning line using said dot screen;

determination means for determining which of said first image producing means and said second image producing means produces an output image corresponding to said image inputted by said image inputting means according to said information inputted by said information inputting means, the information to be added to said image being represented by the second pixel having said second geometric feature value different from said first geometric feature value;

controlling means for controlling said first image producing means and said second image producing means in accordance with said determination made by said determination means to produce said output image using said dot screen but without changing the image density, wherein one of said first geometric feature and said second geometric feature is a shape of said output pixel.

6. An image forming apparatus comprising:

image inputting means for inputting an image having an image density;

information inputting means for inputting information to be added to said image;

first image producing means for producing an output image that includes a first pixel having a first geometric feature value on every scanning line using a dot screen which changes the size of an output pixel depending on desired density of said output pixel;

second image producing means for producing an output image that includes a second pixel having a second geometric feature value different from said first geometric feature value of said first pixel produced by said first image producing means on every scanning line using said dot screen;

determination means for determining which of said first image producing means and said second image producing means produces an output image corresponding to said image inputted by said image inputting means according to said information inputted by said information inputting means, the information to be added to said image being represented by the second pixel having said second geometric feature value different from said first geometric feature value; and controlling means for controlling said first image producing means and said second image producing means in accordance with said determination made by said image producing means determination means to produce said output image using said dot screen but without changing the image density, wherein one of said first geometric feature and said second geometric feature is a direction of said output pixel.

7. An image forming apparatus comprising:

image inputting means for inputting an image having an image density;

background image inputting means for inputting a background image of said image;

information inputting means for inputting information to be added to said background image;

first image producing means for producing an output image that includes a first pixel having a first geometric feature value on every scanning line using a dot screen which changes the size of an output pixel depending on desired density of said output pixel;

second image producing means for producing an output image that includes a second pixel having a second geometric feature value different from said first geometric feature value of said first pixel produced by said first image producing means on every scanning line using said dot screen;

determination means for determining which of said first image producing means and said second image producing means produces an output image corresponding to said background image inputted by said background image inputting means according to said information inputted by said information inputting means, the information to be added to said background image being represented by the second pixel having said second geometric feature value different from said first geometric feature value; and controlling means for controlling said first image producing means to produce an output image corresponding to said image inputted by said image inputting means using said dot screen, and for controlling one of said first image producing means and said second image producing means in accordance with said determination made by said determination means to produce said output image corresponding to said background image using said dot screen but without changing the image density, wherein one of said first geometric feature and said second geometric feature is a shape of said output pixel.

8. An image forming apparatus comprising:

image inputting means for inputting an image having an image density;

background image inputting means for inputting a background image of said image;

information inputting means for inputting information to be added to said background image;

first image producing means for producing an output image that includes a first pixel having a first geometric feature value on every scanning line using a dot screen which changes the size of an output pixel depending on desired density of said output pixel;

second image producing means for producing an output image that includes a second pixel having a second geometric feature value different from said first geometric feature value of said first pixel produced by said first image producing means on every scanning line using said dot screen;

determination means for determining which of said first image producing means and said second image producing means produces an output image corresponding to said background image inputted by said background image inputting means according to said information inputted by said information inputting means, the information to be added to said background image being represented by the second pixel having said second geometric feature value different from said first geometric feature value; and controlling means for controlling said first image producing means to produce an output image corresponding to said image inputted by said image inputting means using said dot screen, and for controlling one of said first image producing means and said second image producing means in accordance with said determination made by said determination means to produce said output corresponding to said background image using said dot screen but without changing the image density, wherein one of said first geometric feature and said second geometric feature is a direction of said output pixel.

* * * * *